United States Patent [19]
Morrison

[11] Patent Number: 4,643,300
[45] Date of Patent: Feb. 17, 1987

[54] IDLER ROLL ASSEMBLY
[75] Inventor: Thomas E. Morrison, Guin, Ala.
[73] Assignee: Continental Conveyor & Equipment Co., Sherman, Tex.
[21] Appl. No.: 721,730
[22] Filed: Apr. 10, 1985
[51] Int. Cl.[4] ............................................. B65G 39/10
[52] U.S. Cl. .................................................... 198/842
[58] Field of Search ............... 384/586, 589, 418, 419, 384/465, 473, 474; 198/501, 830, 828, 842, 780; 29/116 AD, 116 R; 193/37

[56] References Cited
U.S. PATENT DOCUMENTS

| 1,483,170 | 2/1924 | Flesch | 384/586 |
| 3,157,272 | 11/1964 | Bay | 198/842 |
| 3,332,536 | 7/1967 | Ebly et al. | 198/501 |
| 3,334,523 | 8/1967 | Rieser | 198/842 X |
| 3,489,468 | 1/1970 | Buck | 384/474 |
| 3,901,568 | 8/1975 | Gadd et al. | 384/589 |
| 3,917,363 | 11/1975 | Korting | 384/128 |

FOREIGN PATENT DOCUMENTS

| 155354 | 5/1952 | Australia | 198/501 |
| 826264 | 12/1951 | Fed. Rep. of Germany | 198/842 |
| 2315046 | 12/1973 | Fed. Rep. of Germany | 198/501 |

Primary Examiner—Joseph E. Valenza
Assistant Examiner—D. Glenn Dayoan
Attorney, Agent, or Firm—Pearne, Gordon, McCoy, & Granger

[57] ABSTRACT

An idler roller assembly for use with a belt conveyor having a roll cylinder supported by spaced roll heads with anti-friction roller bearings whose shaft is larger in the center than at the ends to reduce shaft deflection. The hub supports a pair of spaced seals that frictionally contact the ends of the shaft to seal the bearing assembly.

8 Claims, 6 Drawing Figures

FIG. 6

SHAFT COMPARISONS

| SHAFT NO. | MATERIAL | RIGIDITY INDEX | SIZE IN BEARING | WEIGHT LB./FT. | MATERIAL COST $/FT. | COST OF 64 5/16 SHAFT |
|---|---|---|---|---|---|---|
| 1. | PRESENT 3/4" ⌀ CRS | 1.000 | .7495 / .7475 | 1.502 | .35 | $ 1.93 |
| 2. | PRESENT 3/4" O.D. TUBE X .203 WALL, SINKDRAWN | .970 | .7498 / .7473 | 1.254 | .98 | $ 5.34 |
| 3. | PROPOSED 1 1/4" O.D. TUBE X .120 WALL, ELEC. WELDED | 4.451 | .7498 / .7493 | 1.467 | .50 | $ 3.80 |
| 4. | 1" ⌀ CRS | 3.177 | .9995 / .9975 | 2.670 | .88 | $ 4.77 |
| 5. | PRESENT SDX 1 1/4" ⌀ CRS | 7.733 | 1.2495 / 1.2475 | 4.172 | 1.46 | $ 7.88 |
| 6. | PRESENT SDX 1 1/4" O.D. TUBE, X .716 I.D., D.O.M. | 6.897 | 1.2498 / 1.2468 | 2.833 | 2.08 | $11.23 |

IDLER ROLL ASSEMBLY

BACKGROUND OF THE INVENTION

This invention relates to an idler roll assembly and more particularly to an idler roll assembly for use with a troughing belt conveyor.

The upper run of belt conveyors is conventionally supported at its respective ends by pulleys and in between such end pulleys by a plurality of carriers. A carrier is a frame extending transversely of the conveyor belt that journals generally three rollers in end-to-end relationship. Generally the intermediate roller is disposed in a horizontal position while the outer two rollers are disposed at an upwardly inclined angle relative to horizontal plane to thereby give the upper run of the belt a troughing shape for the purpose of keeping the load centered on the belt.

It is the practice to provide a shaft for the idler roller of sufficient capacity and bearings of sufficient size to maintain as long a span between carriers as possible. It has been a problem where the loads imposed on the rollers is of sufficient size that it has become necessary to increase shaft size and bearing size. In many instances it is necessary to reduce the load to prolong the useful life of the idler roll assembly. In this instance, it is difficult to monitor the loadings and has therefore been necessary to increase shaft and bearing sizes. It is an object of the present invention to significantly improve idler roll assembly quality and capacity by increasing shaft rigidity without greatly increasing shaft and roll cost. The present invention accomplishes this task by utilizing a hollow shaft of a larger diameter than a given shaft and bearing size that indicated a problem with shaft rigidity yet by swaging the respective ends of such larger shaft to the given shaft and bearing size achieved over a quadrupling of shaft rigidity at a minimum of increase in cost. This procedure is considerably more desirable and advantageous than the heretofore practice of increasing both shaft and bearing size.

SUMMARY OF THE INVENTION

The present invention contemplates the swaging of the respective end portions of a hollow shaft to maintain the advantage of a smaller bearing size while significantly increasing the shaft's rigidity thereby reducing shaft deflection and corresponding bearing misalignment and dislocation of sealing surfaces within bearings located at the respective end portions of the shaft which support a roll cylinder of a roller bearing assembly.

BRIEF DESCRIPTION OF THE DRAWINGS

FIG. 6 is a chart comparing features of several shafts of varying construction.

DETAILED DESCRIPTION

Figures 1, 2:
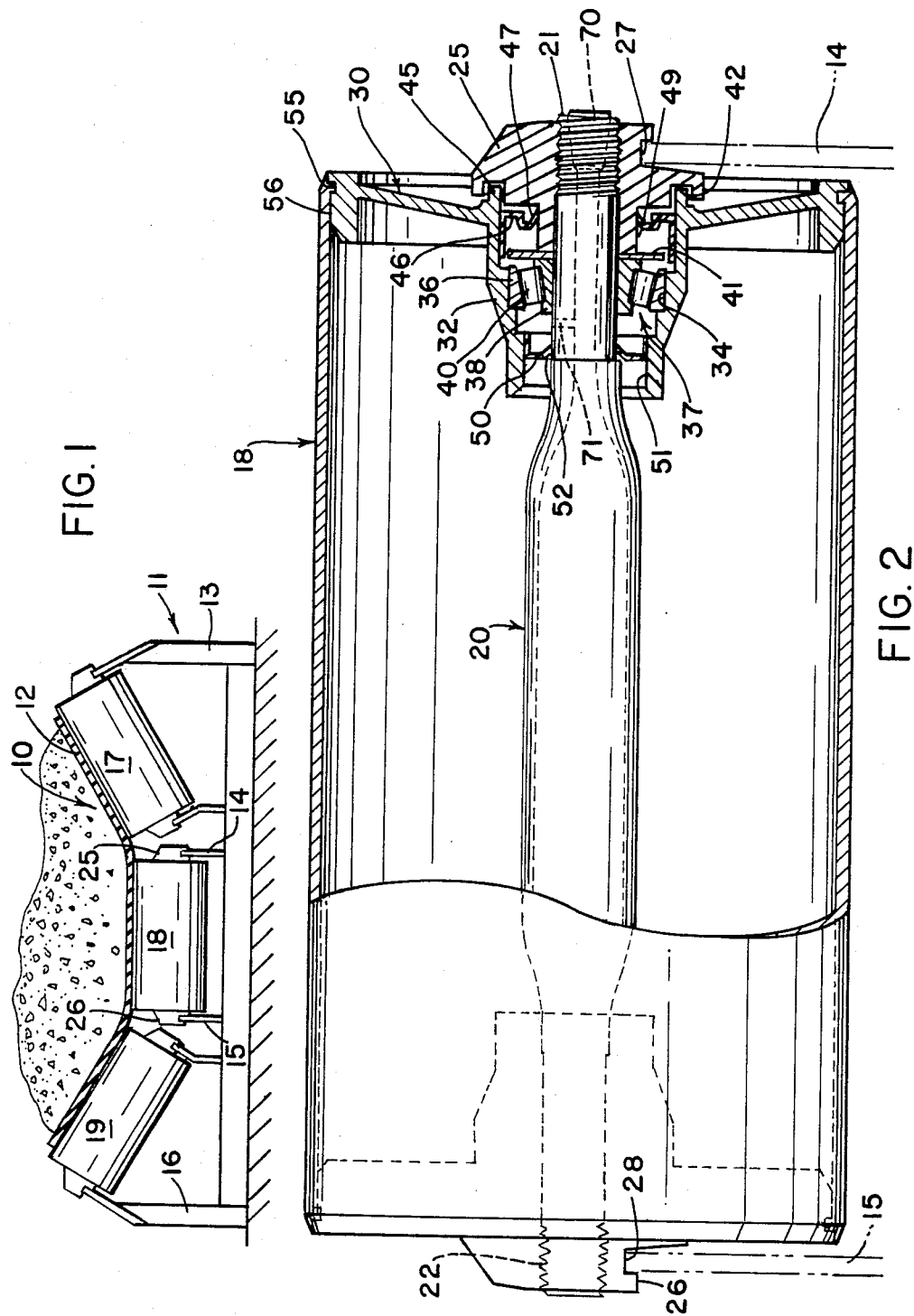
FIG. 1 is a front elevational view showing an idler roller assembly for a troughing belt conveyor loaded with a bulk material.
FIG. 2 is an enlarged front elevational view of a single roll assembly partly in cross section.
Figure 3:
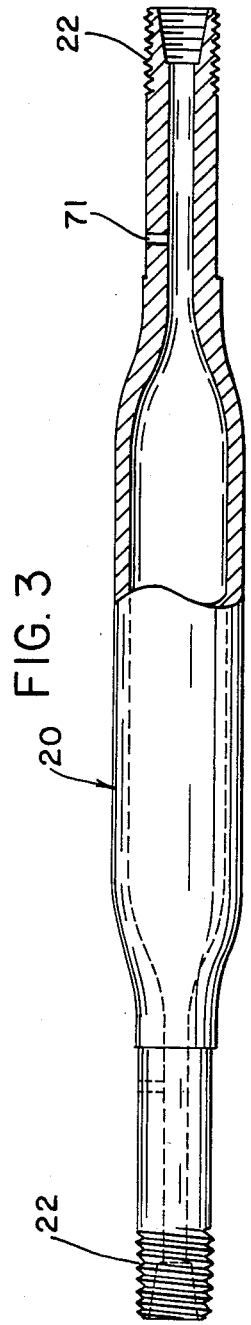
FIG. 3 is a front elevational view partly in cross section of a support shaft for an idler roll assembly.

Referring to the drawings wherein like reference numerals refer to like and corresponding parts throughout the several views, there is shown in FIG. 1 an idler roll assembly 10 mounted on a carrier frame 11 for supporting the upper run of a conveyor belt 12. Carrier frame 11 has a plurality of vertically disposed frame members 13 through 16 supporting three idler rollers or roll cylinders 17, 18 and 19.

All of the idler rollers are constructed in the same manner, however, only one will be described. As shown in FIG. 2, a shaft 20 extends through the roller or roll cylinder 18 and is provided with threaded end portions 21 and 22 which receive nuts 25 and 26 respectively. Nuts 25 and 26 are slotted as at 27 and 28 to receive the U-shaped end portions of frame members 14 and 15 and thereby lock in shaft 20 against rotation.

Shaft 20 is hollow from end to end, which ends are swaged to a smaller round diameter. During such swaging process, the respective wall thickness of the end portions are increased while reducing the outside diameter of the shaft. Such swaging materially maintains greater rigidity of the larger shaft portion while only a small percentage of the shaft length has been reduced to the original bearing size. This action permits the increasing of shaft capacity significantly without increasing the diameter of the bearing where otherwise both shaft and bearing size would be increased along with a corresponding increase in size of other roll components.

The respective end portions of roller or roll cylinder 18 have roll heads 30 (only one shown) mounted within each end thereof. Each roll head 30 is provided with an inwardly extending hub 32 which has an inner annular recess 34 for receiving the outer race 36 of a bearing unit 37. Bearing unit 37 has an inner race 38 that is seated on the reduced end portion of shaft 20. Suitably mounted between the outer race 36 and the inner race 38 are a plurality of circumferentially spaced tapered roller bearings 40.

Mounted on the end portion of shaft 20 between the inner race 38 and the nut 25 is an annular washer 41. To insure a positive sealing of the interior of the shaft 20 from foreign matters, nut 25 has an annular recess 42 on its inner surface, receiving an annular abutment 45 that extend therein from the hub 32. Sufficient clearance space is necessary between the recess 42 and annular abutment 45 to insure free running of the hub relative to the stationary nut 25. An annular seal 46 is press fitted into an axially outermost portion of the bore of the hub 32, wherein seal 46 has an annular lip 47 that frictionally rides on an annular surface 49 of nut 25. A second annular seal 50 is press fitted into an axially disposed innermost portion 51 of the central bore of the hub 32. Seal 50 has an annular lip 52 that rides on the reduced portion of shaft 20 to further seal the bearing unit 37 from foreign matter.

The roll cylinder 18 is secured to the roll head or annular flange 30 via an annular groove 55 formed in the outer periphery 56 of each roll head or annular flange 30 and thence via a forming action, pressure is applied to the outer surface of the roll cylinder 18 to form an inwardly extending projection which secures the roll cylinder to the roll head 30.

The respective ends of the shaft 20 are internally threaded to receive plugs 70 to provide means for lubricating bearing unit 37 via bore 71 that extends from the central bore of shaft 20 through the wall thereof and communicates with bearing unit 37 between annular seals 50 and 46. Such described roll construction is an example of the invention which can be used for similar shaft, bearing, seal, and end securing means.

As an example of the invention's ability to improve idler roll quality and capacity with the use of this unique shaft and bearing structure, reference is made to the chart of FIG. 6. A solid standard three-fourth (¾) inch cold rolled steel shaft having a rigidity index of 1.000 cost $0.35 per lineal foot. The total cost of such a shaft (64-5/16" long) is $1.93 which is the length of the 63" cylinder roll under consideration. If a lubrication passageway through the shaft is required, shaft 2, ¾" O.D. sink drawn tube, must be used. This shaft has a rigid index of only 0.970 but a material cost of $0.98 per lineal foot (due to the tube's manufacturing process) resulting in a shaft cost of $5.34. In both of these instances the exterior end portions must be purchased to standard commercial tolerances which are broader than desired to receive a ¾ inch bearing. Shaft number 3, which is the shaft of the above described invention, utilizes a 1¼" O.D. (outside diameter) tube with a wall thickness of 0.120 inch having its end portions swaged to approximately a three-fourth (¾") inch outside diameter thus using the same end bearings as in shaft numbers 1 and 2. As seen from the chart, shaft number 3 has a rigidity index of over four times that of a ¾ inch cold rolled steel shaft. Commercially, manufacturers of idler roller assemblies having difficulty with shaft deflection have sometimes used one-inch bearings with cold rolled steel shafts which have a rigidity index of 3.177 compared to 4.451 for the swaged end shaft of the present invention. In addition, such shaft number 4 costs more and is approximately twice as heavy. A one and one fourth (1¼") inch cold rolled steel shaft (shaft #5) takes a much larger bearing, costs over double shaft #3 and is materially heavier in weight. A hollow one and one-fourth (1¼") inch tube also has the draw back of materially increasing the cost of such a shaft, weighs more and takes a much larger bearing. The use of shaft number 3 is justified because the ¾ inch tapered roller bearing it utilizes is a high volume, low cost product with high radial load capacity if deflection can be held within allowable limits and capacity is more than five times actual applied loads.

Figure 5:
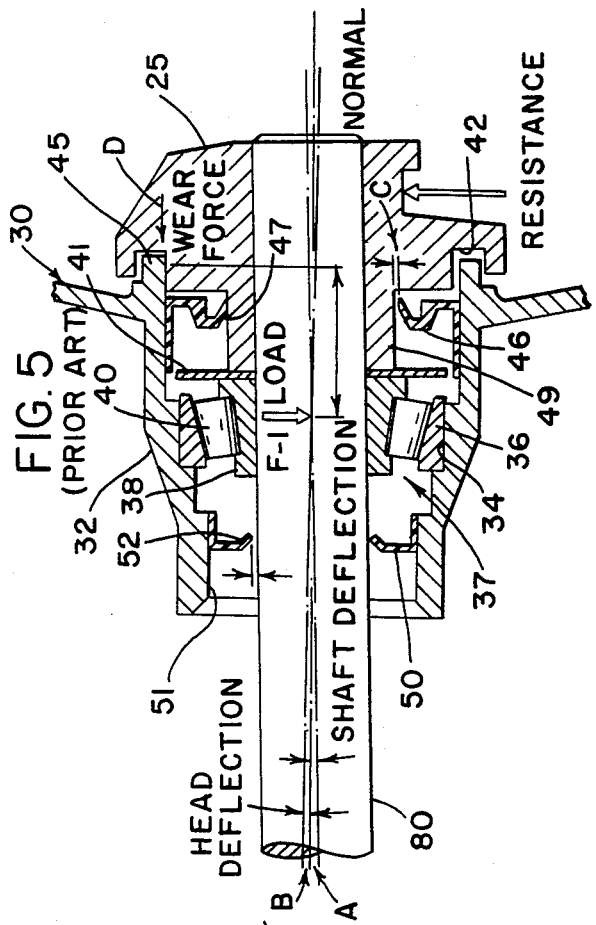
FIG. 5 is an enlarged sectional view of a conventional prior art bearing assembly as supported on a shaft of an idler roll assembly under load.

FIG. 5 discloses the prior art roller bearing assembly and shaft wherein the shaft is designated as 80 and the annular flange or head and bearing units are identical to that described above and therefore carry the same reference numerals including head 30, hub 32, bearing unit 37, annular abutment 45, seal 46 with lip 47, seal 50 with lip 52, and nut 25 with annular recess 42.

Figure 4:
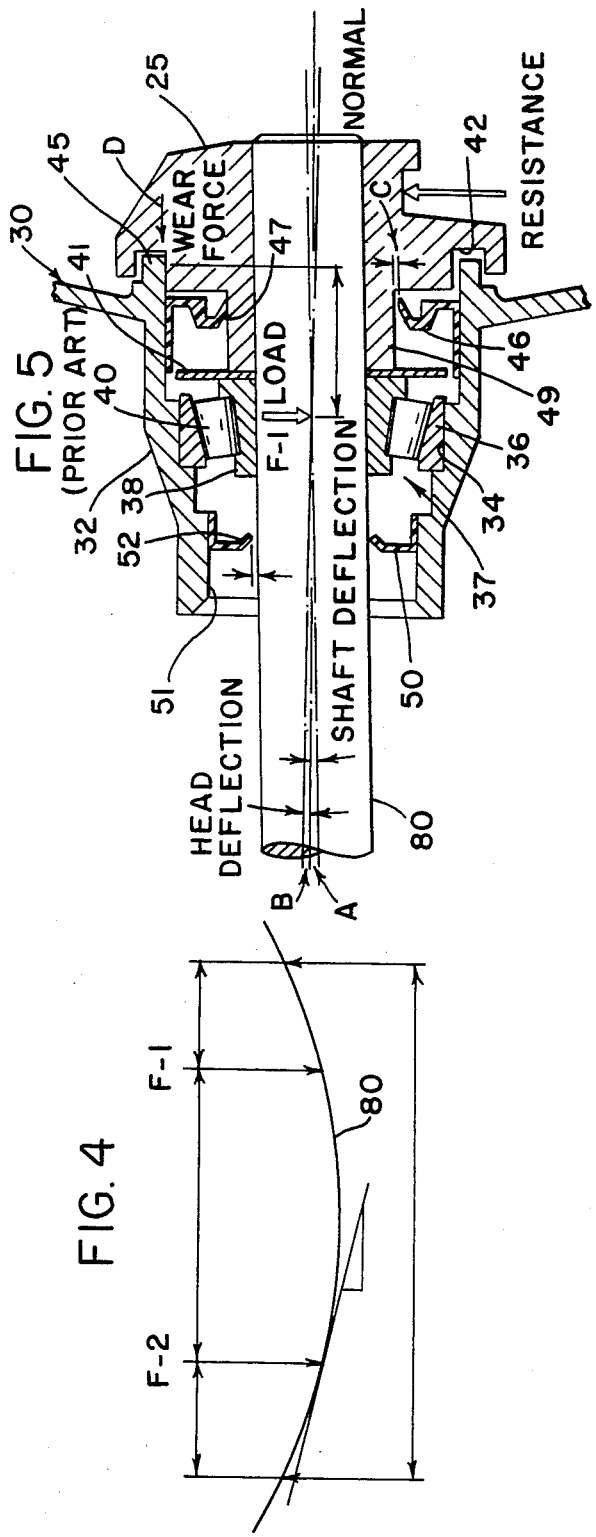
FIG. 4 is a force diagram illustrating the different forces exerted on the support shaft of a loaded idler roller assembly.

With the roller assembly 10 under full load, such load is exerted as a pair of forces F-1 and F-2 on the spaced bearing units 37 as indicated in FIG. 4. In the conventional roller assembly as depicted by FIG. 5, the shaft deflection is indicated by reference numeral A, while the head deflection is indicated by reference numeral B. Under these conditions of load, the lip 52 of annular seal 50 becomes skewed and a portion thereof pulls away from contact with the end portion of the shaft and allows foreign matter to enter into the bearing unit. In addition, seal 46 presents the same problem as indicated by reference letter C. Another area that presents another serious problem is the wear forces encountered as at D (FIG. 5) between the hub 32 and the recessed surface of recess 42 on nut 25, wherein the running clearances between recess 42 and annular abutment 45 now becomes a rubbing interference. To compensate for these, the shaft deflection load ratings are reduced while some manufacturers have increased the diameter of the shaft and correspondingly the bearing size. By the swaging process of the instant invention, the thickness of the end walls of the shaft are increased while reducing the diameter of the end portions of the shaft. With this unique arrangement increased loading without excessive shaft deflection and the corresponding problems of running interference, seal deflection, and bearing misalignment is achieved.

The examples used are directed to troughing rolls which support the carrying side of a conveyor belt; and another application for the extra rigid shaft is on the single rolls which support the full width of the return belt. Shaft deflection is a common problem because of long roll (and shaft) lengths, which is solved by the present invention. While only one embodiment of the invention has been shown, it will be obvious that it is not to be so limited, but is susceptible of various changes and modifications without departing from the spirit thereof.

I claim:

1. In an idler roll assembly for a belt conveyor in which the ends of the idler are supported by upstanding frame members, a roll, a hollow circular shaft extending through said roll, said shaft having swaged reduced circular end portions with outside diameters substantially less than the major outside diameter of a midportion of the shaft between such end portions and with inside diameters substantially less than the major inside diameter of such midportion and with the very ends thereof being threaded, a supporting nut threadedly engaging each of said threaded ends, bearing units mounted between said roll and said swaged end portions inwardly of the ends of each supporting nut for supporting the roll for rotation about said shaft, said nuts being mounted on said frame members for supporting said idler roll assembly, the bearing units each having an inner race directly engaging its associated shaft end portion.

2. In an idler roll assembly for a belt conveyor as set forth in claim 1 wherein said swaged ends have a thicker wall than the wall of the intermediate portion of said hollow cylindrical shaft.

3. In an idler roll assembly for a belt conveyor as set forth in claim 2 wherein said thickness of said swaged wall ends is over thirty percent greater in thickness than said wall of said intermediate portion of said hollow shaft.

4. An idler roll assembly comprising:
a pair of elongated side frame members maintained in fixed and spaced relationship, a roll cylinder, a pair of laterally spaced roll heads mounted witihin the respective ends of said roll cylinder, each of said roll heads having a hub extending axially inwardly thereof, bearing means mounted in each of said hubs to provide rotation for said roll cylinder, each of said bearing means having and inner race defining a cylindrical opening, a tubular shaft positioned within said roll cylinder having an intermediate tubular portion of cylindrical cross sectional shape and respective end portions of cylindrical cross sectional shape, said end portions being swaged to provide substantially reduced inside and diameters relative to said intermediate portion, the openings of each inner race of the bearing means being in direct engagement with its associated shaft end portion, and securing means mounted on said end portions to retain said bearing means on said end portions.

5. An idler assembly as set forth in claim 4 wherein each of said end portions has threaded ends, a nut threadedly engaging each of said threaded ends, said nuts being connected to said side frames to support said roll cylinder for rotation, each of said bearing means having a pair of spaced seals frictionally contacting said end portions, and each of said nuts being recessed to receive an annular abutment of said hub with a running clearance space therebetween.

6. An idler roll assembly as set forth in claim 4 wherein said swaged end portions have wall thickness thicker than the wall thickness of said intermediate portion.

7. An idler roll assembly as set forth in claim 6 wherein said wall thickness of said end portions is at least forty percent greater than said wall thickness of said intermediate portion.

8. An idler roll assembly as set forth in claim 4 wherein said swaging of said end portions reduced the outside diameter of said tubular shaft between 30 to 50%.

* * * * *